(12) United States Patent
Blumenfeld

(10) Patent No.: US 7,602,552 B1
(45) Date of Patent: Oct. 13, 2009

(54) HEAD-UP DISPLAY SYSTEM

(75) Inventor: Yoel Blumenfeld, Rehovot (IL)

(73) Assignee: Elbit Systems Electro-Optics Elop Ltd., Rechovot (IL)

( * ) Notice: Subject to any disclaimer, the term of this patent is extended or adjusted under 35 U.S.C. 154(b) by 308 days.

(21) Appl. No.: 11/432,555

(22) Filed: May 12, 2006

(30) Foreign Application Priority Data

May 15, 2005 (IL) .................................... 168581

(51) Int. Cl.
*G02B 27/14* (2006.01)
(52) U.S. Cl. ...................... 359/630; 359/631
(58) Field of Classification Search ............. 359/630
See application file for complete search history.

(56) References Cited

U.S. PATENT DOCUMENTS 4,218,111 A * 8/1980 Withrington et al. ......... 359/13
4,383,740 A * 5/1983 Bordovsky .................. 359/631
6,262,849 B1 * 7/2001 Potin et al. .................. 359/631
7,095,562 B1 * 8/2006 Peng et al. ................... 359/630

* cited by examiner

*Primary Examiner*—Jordan M. Schwartz
*Assistant Examiner*—James C Jones

(57) ABSTRACT

A head-up display system includes a display device for generating and displaying information to an eye of an observer; a tilted power combiner for superimposing the information displayed by the display device onto the forward view of the outside by the eye of the observer; and a relay optic assembly between the display device and the tilted power combiner for forming an intermediate image of the displayed information forwardly of the combiner that reflects the image towards the eye of the observer within an eye motion box to produce a large field of view for the observer. The relay optic assembly is void of holographic elements and includes a spherical mirror generating aberrations in the intermediate image tending to compensate for aberrations produced by the tilted power combiner.

20 Claims, 2 Drawing Sheets

HEAD-UP DISPLAY SYSTEM

RELATED APPLICATION

This application includes subject matter, and claims the priority date of Israel Patent Application No. 168581, filed on May 15, 2005, the contents of which are incorporated herein by reference.

FIELD AND BACKGROUND OF THE INVENTION

The present invention relates to head-up display (or HUD) systems for displaying information to an observer in a manner conveniently seen by the observer.

Head-up display systems have been used for many years, particularly in military aircraft but more recently in many other applications requiring the display of information to an observer in a manner conveniently seen by the observer. Such systems generally include a display device, such as a CRT or LCD, for generating and displaying information to the observer, and a tilted power combiner for superimposing the information displayed by the display device into the forward view of the outside world by the observer. The information to be displayed, e.g., instrument panel information, is thus superimposed into the forward view of the outside world by the observer. Such information is seen simultaneously with the forward view of the outside world and, therefore, does not require movement of the observer's eyes from the forward view.

In order to produce a large field of view for the observer, head-up display systems generally include a relay optic assembly between the display device and the tilted power combiner for forming an intermediate image of the displayed information forwardly of the combiner that reflects the image towards the eye of the observer within an eye motion box. Such head-up display (HUD) systems are frequently called pupil-imaging HUDs since they have the effect of locating the displayed image in the plane of the observer's eyes, and thereby provide a much large instantaneous field of view.

Tilted power combiners inherently produce aberrations which are difficult to correct in the relay optic assembly.

Moreover, many of the known pupil-imaging HUD designs lack the ability to view the total field of view over the entire exit pupil because of inherent design limitations. This is mainly due to the aberrations typically seen at the edges of the eye motion box, which are also difficult to correct using standard designs.

In addition, many of the known designs use a doublet for the combiner that may be holographic in order to correct for both parallax errors and line-of-sight errors resulting from the radius or power of the combiner. Such doublets, besides being relatively complex and therefore costly to produce, are relatively heavy and therefore more sensitive to line-of-sight movements resulting from platform vibrations.

It is thus seen that the design of the relay optic assembly in a pupil-imaging HUD is difficult and complicated for achieving high-quality imagery over a reasonable field of view. Such relay optic assemblies therefore typically include holographic elements. However, relay optic assemblies based on holography involve not only high initial development costs, but also high non-recurring expenses since each system generally must be specially designed for each particular application.

OBJECTS AND BRIEF SUMMARY OF THE PRESENT INVENTION

An object of the present invention is to provide a head-up display system which does not require holographic elements, and which can be implemented by the use of a few relatively simple optical elements. Another object of the invention is to provide a head-up display system which is of a flexible design and which inherently permits the system to be tailored for different applications with a minimum of development costs and non-recurring expenses.

According to one aspect of the present invention, there is provided a head-up display system comprising: a display device for generating and displaying information to an eye of an observer; a tilted power combiner for superimposing the information displayed by the display device onto the forward view of the outside by the eye of the observer; and a relay optic assembly between the display device and the tilted power combiner for forming an intermediate image of the displayed information forwardly of the combiner that reflects the image towards the eye of the observer within an eye motion box to produce a large field of view for the observer; characterized in that the relay optic assembly is void of holographic elements and includes a spherical mirror generating aberrations in the intermediate image tending to compensate for aberrations produced by the tilted power combiner.

According to further features in the described preferred embodiment, the relay optic assembly further includes a flat mirror spaced from a spherical mirror such as to receive reflections directly therefrom. In the described preferred embodiment, the flat mirror is spaced from the spherical mirror by an air gap, and the position of the flat mirror relatively to the spherical mirror is variable. Such an arrangement imparts flexibility to the design, enabling the system to be tailored for different applications with a minimum of initial development costs and non-recurring expenses.

According to another aspect of the present invention, there is provided a head-up display system, comprising: a display device for generating and displaying information to an eye of an observer; a tilted power combiner for superimposing the information displayed by the display device into the forward view of the outside by the eye of the observer; and a relay optic assembly between the display device and the tilted power combiner for forming an intermediate image of the displayed information forwardly of the combiner that reflects the image towards the eye of the observer within an eye motion box to produce a large field of view for the observer; the tilted power combiner including a front surface of a first curvature having a first optical axis, and a back surface of a second curvature having a second optical axis at a predetermined angle to the first optical axis, such that the tilted power combiner is of a wedge configuration with the predetermined angle defining the wedge angle of the combiner.

A combiner constructed as described above thus has an inherent built-in wedge which serves to correct line-of-sight errors. Such a construction also eliminates the need for a doublet for the combiner which, as indicated above, was heretofore generally used to correct for both parallax errors and line-of-sight errors due to the radius or power of the combiner. Many of the other drawbacks mentioned above, such as the need for relatively complex, costly, and heavier elements particularly in the conventional holographic HUD systems, may thus be reduced or eliminated in systems constructed according to the present invention.

According to a further aspect of the present invention, there is a provided a head-up display system comprising a display device for generating and displaying information to an observer; a tilted power combiner for superimposing the information displayed by the display device into the forward view of the outside by the observer; and a relay optic assembly between the display device and the tilted power combiner for forming an intermediate image of the displayed information forwardly of the combiner that reflects the image towards the eye of the observer within an eye motion box forwardly of the combiner to produce a large field of view for the observer; the tilted power combiner having a front surface, a back surface, and a dichroic coating on the front surface.

Such a system thus achieves the optimal reflection and transmission characteristics, not by the use of holographic elements as in the previous systems, but rather by the use of a narrow band thin-film dichroic coating on the combiner. This is advantageous not only because such a coating can be applied with relative ease and at low cost, but also because the use of thin film coatings produces a more natural representation of the outside world with negligible color shift.

Further features and advantages of the invention will be apparent from the description below.

BRIEF DESCRIPTION OF THE DRAWINGS

The invention is herein described, by way of example only, with reference to the accompanying drawings, wherein.

It is to be understood that the foregoing drawings, and the description below, are provided primarily for purposes of facilitating understanding the conceptual aspects of the invention and possible embodiments thereof, including what is presently considered to be a preferred embodiment. In the interest of clarity and brevity, no attempt is made to provide more details than necessary to enable one skilled in the art, using routine skill and design, to understand and practice the described invention. It is to be further understood that the embodiment described is for purposes of example only, and that the invention is capable of being embodied in other forms and applications than described herein.

DESCRIPTION OF A PREFERRED EMBODIMENT

Figure 1:
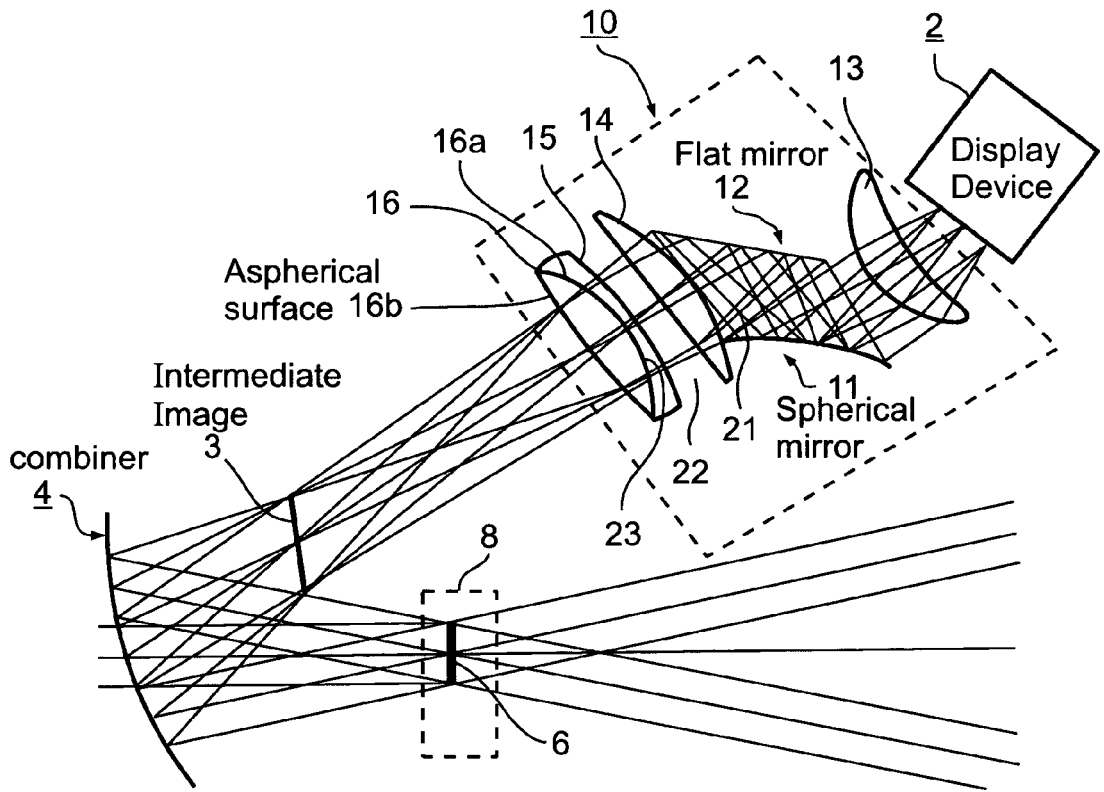
FIG. 1 illustrates one form of head-up display system constructed in accordance with the present invention.

The head-up display system illustrated in FIG. 1 includes a display device 2 for generating and displaying information to an observer, and a tilted power combiner 4 for superimposing the information displayed by the display device into the forward view of the outside world by the observer. Display device 2 may be a CRT, an LCD, or a similar device for generating and displaying information, such as aircraft information normally displayed on an instrument panel.

In order to provide a large instantaneous field of view to the observer, the information displayed by display device 2 is formed into an intermediate image in a plane 3 forwardly of the combiner 4 and reflected towards the eye of the observer. Plane 6 defines the location of the observer's eye-pupil according to the design eye position (DEP) of the respective head-up display system. Such systems are generally designed so that the DEP plane fits within a prescribed eye motion box, generally designated 8. The eye motion box 8 may be dimensioned, for example, to have a width of 3 inches, a vertical height of 2 inches, and a depth of 4 inches.

Figure 2:
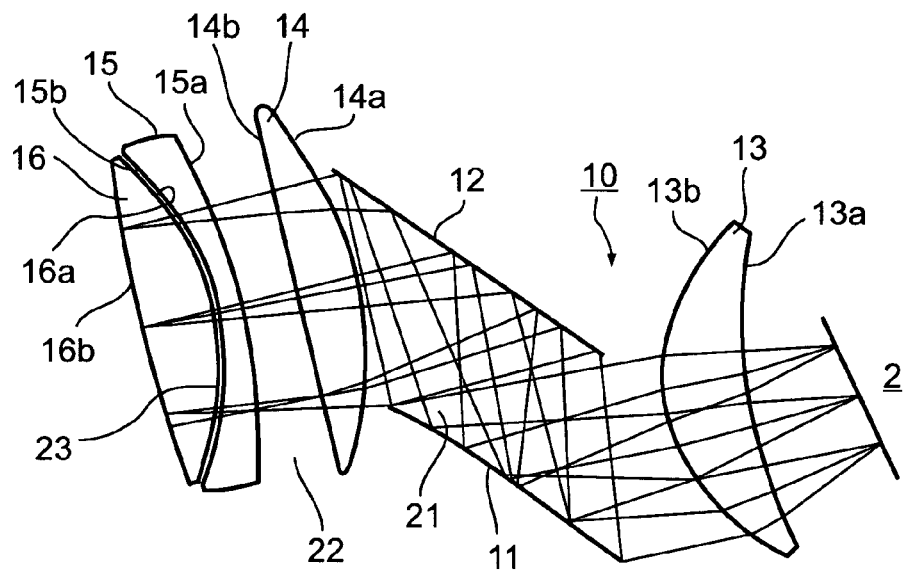
FIG. 2 is an enlarged fragmentary view more particularly illustrating the relay optic assembly in the system of FIG. 1.

The intermediate image produced in the plane 3 forwardly of combiner 4 is formed by the relay optic assembly, generally designated 10 in FIG. 1, and more particularly shown in FIG. 2. As indicated earlier, the typical-imaging HUD system presently uses at least one holographic optical element in the relay optic assembly in order to overcome the off-axis optical aberrations induced by the tilted combiner. The relay optic assembly 10 illustrated in FIGS. 1 and 2 does not require such a holographic optical element, but rather compensates for the aberrations by using relatively simple and inexpensive optical elements which can generally be produced using standard optical production techniques.

Thus, the relay optic assembly 10 includes a spherical mirror 11 which generates aberrations in the DEP plane 6 tending to compensate for aberrations produced by the tilted power combiner 4. Relay optic assembly 10 further includes a flat mirror 12 spaced from the spherical mirror such as to receive reflections directly from the spherical mirror. The spacing between the two mirrors 11, 12 is in the form of an air gap indicated as 21. Preferably this spacing is variable to permit adjustment of the position of flat mirror 12 with respect to spherical mirror 11 according to the particular application of the respective HUD system.

The relay optic assembly 10 further includes a meniscus lens 13 having a concave face 13a facing the display device 2, and a convex face 13b facing the spherical mirror 11. Meniscus lens 13 corrects for field aberrations.

Relay optic assembly 10 further includes a spherical lens 14, and a front air spaced doublet lens assembly including a lens 15 facing spherical lens 14, and another lens 16 facing the combiner 4. Spherical lens 14 has a spherical surface 14a facing flat mirror 12, and a planer surface 14b facing doublet lens 15 spaced therefrom by an air gap 22. Lens 15 has a convex surface 15a facing lens 14, and a concave surface 15b facing lens 16 and spaced therefrom by an air gap 23. Lens 16 has a spherical surface 16a spaced from concave surface 15b of lens 15, and an aspherical surface 16b facing the combiner 4.

Following is one example of a specific design for the various surfaces in the relay optic assembly 10 illustrated in FIGS. 1 and 2.

SURFACE DATA

| SURF | RADIUS | THICKNESS | MEDIUM | INDEX | V-NUMBER |
|---|---|---|---|---|---|
| 6 | INFINITE | | | | |
|  | INFINITE | −260.00000 | -AIR | | |
| 4A | 349.57000 | 0.00000 | AIR | | |
|  |  | 450.00000 | AIR | | |
| 16bA OHARA | 455.83000 O | 32.00000 | S-LAL8 | 1.71804 | 187.83 |
| 16a | −129.40000 | 2.86000 | AIR | | |
| 15b OHARA | −120.51500 | 8.00000 | S-TIH53 | 1.86023 | 80.99 |
| 15a | −343.58700 | 27.25000 | AIR | | |
| 14b OHARA | INFINITE | 27.00000 | S-LAL8 | 1.71804 | 187.83 |
| 14a | −178.22800 | 52.50000 | AIR | | |

-continued

SURFACE DATA

| SURF | RADIUS | THICK-NESS | ME-DIUM | INDEX | V-NUMBER |
|---|---|---|---|---|---|
| 12 A | INFINITE | 0.00000 | -AIR | | |
| 21 | | -100.00000 | -AIR | | |
| 11 A | -2582.86000 | 0.00000 | AIR | | |
| | | 69.40000 | AIR | | |
| 13b A OHARA | 90.13400 | 37.00000 | S-LAL8 | 1.71804 | 187.83 |
| 13a | 226.49200 | 48.95000 | AIR | | |
| 2 | INFINITE | 0.00000 | AIR | | |
| IMG | INFINITE | | | | |

KEY TO SYMBOLS
A SURFACE HAS TILTS AND DECENTERS
O SPECIAL SURFACE TYPE
SPECIAL SURFACE DATA
SURFACE NO. 4 -- CONIC + POWER-SERIES ASPHERE
G3 -6.330000E-08(R**4)
CONIC CONSTANT (CC) -1.000000
SEMIMAJOR AXIS (b) 4.558300E+12
SEMIMINOR AXIS (a) 4.558300E+07

Figure 3:
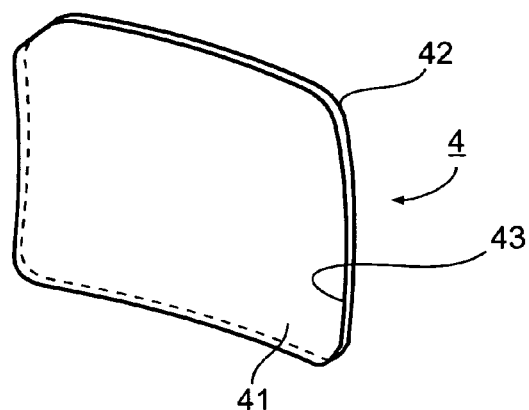
FIG. 3 illustrates the combiner in the system of FIG. 1.
Figure 4:
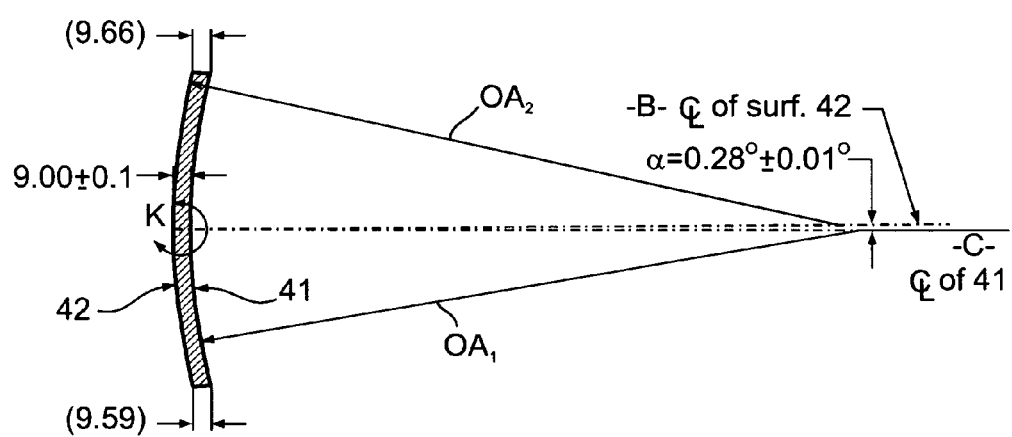
FIG. 4 is a sectional view of the combiner of FIG. 3.

As indicated earlier, a holographic combiner generally uses a doublet in order to correct for both parallax error and line-of-sight error due to the radius or power of the combiner. According to further aspects of the present invention, the line-of-sight error is corrected by constructing the combiner according to a wedge construction, and the parallax error is corrected or reduced by using a proper curvature of the rear surface of the combiner. Such a construction is less costly and easier to implement, then a doublet or holographic combiner The foregoing features are shown in FIGS. 3-4. The tilted power combiner 4 has a front surface 41 of a first curvature having a first optical axis C and a first radius $OA_1$, and a back surface 42 of a second curvature having a second optical axis B and a second radius $OA_2$ at a predetermined angle α to optical axis C of the front surface. Such a construction of the combiner produces a wedge configuration with angle α between the two optical axes C, B defining the wedge angle of the combiner. Angle α is affected by the tilt angle of the combiner and is preferably between 0.1 and 1.0 degrees, preferably about 0.3 degrees, shown in FIG. 4 as 0.28°±0.01°.

As further shown in FIG. 3, the front surface 41 of the combiner carries a thin dichroic film or coating 43 effective to be light reflecting with respect to the information displayed by the display device 2, but light-transmissive with respect to the outside world viewed forwardly of the combiner. As indicated above, the wedge construction of the combiner, as illustrated in FIG. 3, serves to correct the line-of-sight error, while applying the dichroic coating on the front surface 41 of the combiner serves to reflect the image of the display towards the observer. This coating is preferably designed in a way that minimizes color shift within the transmitted light and produces a more natural representation of the outside world Many dichroic coating materials may be used for coating 43, for example those described in U.S. Pat. No. 5,400,174, the contents of which are incorporated herein by reference.

It will be seen that the above-described pupil-imaging HUD provides a number of advantages over the holographic type systems of the prior art. Thus, it achieves optimal reflection and transmission without the need for a holographic combiner, and therefore is not subject to many of the drawbacks of holographic combiners as briefly described above. Moreover, the described system can be implemented with a few relatively simple, symmetrical optical elements. The system enables high-quality imagery of the outside world forwardly of the observer over a relatively large field of view. In addition, the design is inherently flexible and capable of being easily designed for a wide variety of installation situations. In addition, the symmetric design enables it to be implemented in a relatively simple mechanical structure which serves to keep the entire relay optic assembly structurally rigid.

While the invention has been described with respect to one preferred embodiment, it will be appreciated that this is set forth merely for purposes of example, and that many other variations, modifications and applications of the invention may be made.

What is claimed is:

1. A head-up display system, comprising:
   a display device for generating and displaying information to an eye of an observer;
   a tilted power combiner for superimposing the information displayed by the display device onto the forward view of the outside by the eye of the observer, said tilted power combiner being devoid of holographic elements; and
   a relay optic assembly between the display device and the tilted power combiner for forming an intermediate image of the displayed information forwardly of the combiner that reflects the image towards the eye of the observer within an eye motion box to produce a large field of view for the observer;
   said relay optic assembly including:
      (i) a non-refracting spherical mirror generating aberrations in said intermediate image tending to compensate for aberrations produced by the tilted power combiner; and
      (ii) a non-refracting flat mirror spaced from said spherical mirror such as to receive reflections directly therefrom, wherein said flat mirror is spaced from said spherical mirror only by an air gap.

2. The head-up display system according to claim 1, wherein said flat mirror is spaced from said spherical mirror by an air gap wherein the position of said flat mirror relatively to said spherical mirror is variable.

3. The head-up display system according to claim 1, wherein said relay optic assembly further includes a meniscus lens facing said display device.

4. The head-up display system according to claim 1, wherein said relay optic assembly further includes at least one lens having an aspherical surface.

5. The head-up display system according to claim 1, wherein said relay optic assembly further includes a spherical lens between said flat mirror and said tilted power combiner.

6. The head-up display system according to claim 1, wherein said relay optic assembly further includes a front-doublet, air-spaced lens having an aspherical surface between said spherical lens and said tilted power combiner.

7. The head-up display system according to claim 1, wherein: said flat mirror is spaced from said spherical mirror by an air gap; and wherein said relay optic assembly further includes a meniscus lens facing said spherical mirror, a spherical lens facing said flat mirror, and a front-doublet, air-spaced lens having an aspherical surface facing said spherical lens.

8. The head-up display system according to claim 1, wherein said tilted power combiner has a front surface of a first curvature having a first optical axis, and a back surface of a second curvature having a second optical axis at a predetermined angle to the first optical axis, such that the tilted power combiner is of a wedge configuration with said predetermined angle defining the wedge angle of the combiner.

9. The head-up display system according to claim 8, wherein said wedge angle is from 0.1 degrees to 1.0 degrees.

10. The head-up display system according to claim 8, wherein said wedge angle is 0.3 degrees.

11. The head-up display system according to claim 8, wherein said tilted power combiner includes a dichroic coating on said front surface.

12. The head-up display system according to claim 1, wherein said tilted power combiner has a front surface, a back surface, and a dichroic coating on said front surface.

13. A head-up display system, comprising:
   a display device for generating and displaying information to an eye of an observer;
   a tilted power combiner for superimposing the information displayed by the display device into the forward view of the outside by the eye of the observer;
   and a relay optic assembly between the display device and the tilted power combiner for forming an intermediate image of the displayed information forwardly of the combiner that reflects the image towards the eye of the observer within an eye motion box to produce a large field of view for the observer;
   said tilted power combiner including a front surface of a first curvature having a first optical axis, and a back surface of a second curvature having a second optical axis at a predetermined angle to the first optical axis, such that the tilted power combiner is of a wedge configuration with said predetermined angle defining the wedge angle of the combiner.

14. The head-up display system according to claim 13, wherein said wedge angle is from 0.1 degrees to 1.0 degrees.

15. The head-up display system according to claim 13, wherein said wedge angle is 0.3 degrees.

16. The head-up display system according to claim 13, wherein said tilted power combiner includes a dichroic coating on said front surface.

17. A head-up display system, comprising:
   a display device for generating and displaying information to an observer;
   a tilted power combiner for superimposing the information displayed by the display device into the forward view of the outside by the observer, said tilted power combiner being devoid of holographic elements; and
   a relay optic assembly between the display device and the tilted power combiner for forming an intermediate image of the displayed information forwardly of the combiner that reflects the image towards the eye of the observer within an eye motion box to produce a large field of view for the observer;
   whereas said tilted power combiner has a front surface, a back surface, and a dichroic coating on said front surface; and
   wherein said relay optic assembly includes:
     (i) a non-refracting spherical mirror generating aberrations in said intermediate image tending to compensate for aberrations produced by the tilted power combiner; and
     (ii) a flat mirror spaced from said non-refracting spherical mirror such as to receive reflections directly therefrom, wherein said flat mirror is spaced from said spherical mirror only by an air gap.

18. The head-up display system according to claim 1, being devoid of holographic elements.

19. The head-up display system according to claim 17, being devoid of holographic elements.

20. A head-up display system, comprising:
   a display device for generating and displaying information to an eye of an observer;
   a tilted power combiner for superimposing the information displayed by the display device onto the forward view of the outside by the eye of the observer, said tilted power combiner being devoid of holographic elements; and
   a relay optic assembly between the display device and the tilted power combiner for forming an intermediate image of the displayed information forwardly of the combiner that reflects the image towards the eye of the observer within an eye motion box to produce a large field of view for the observer;
   said relay optic assembly including:
     (i) a spherical mirror generating aberrations in said intermediate image tending to compensate for aberrations produced by the tilted power combiner; and
     (ii) a flat mirror spaced from said spherical mirror such as to receive reflections therefrom;
   wherein said flat mirror is spaced from said spherical mirror by an air gap and wherein the position of said flat mirror relatively to said spherical mirror is adjustable.

* * * * *